Figure 1:
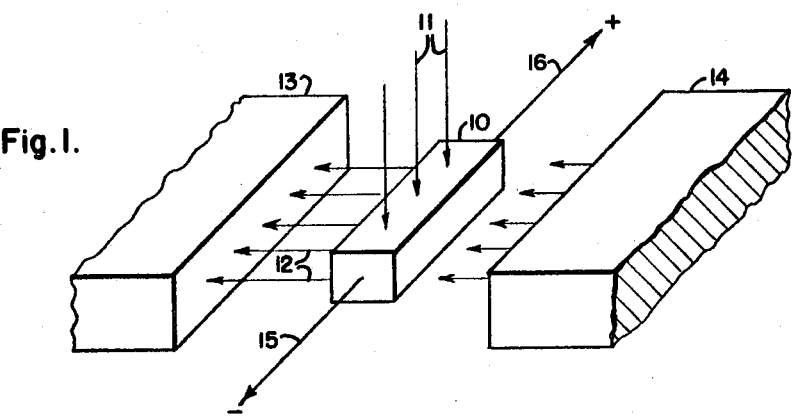

June 21, 1960  R. F. MAXWELL, JR., ET AL  2,942,117
MAGNETIC TRACKING DETECTOR APPARATUS
Filed July 26, 1957

WITNESSES:
Bernard R. Gieguey
Leon J. Jaja

INVENTORS
Richard F. Maxwell, Jr and
Richard F. Higby.
BY Maury I. Hull
ATTORNEY

2,942,117

MAGNETIC TRACKING DETECTOR APPARATUS

Richard F. Maxwell, Jr., Baltimore, and Richard F. Higby, Severna Park, Md., assignors to Westinghouse Electric Corporation, East Pittsburgh, Pa., a corporation of Pennsylvania Filed July 26, 1957, Ser. No. 674,468

13 Claims. (Cl. 250—203)

This invention relates to an improvement in apparatus for detecting and tracking an object emitting radiant energy, and more particularly to such tracking detectors employing magnetic fields for tracking objects which emit light energy. The apparatus is especially sensitive to light in the infrared portion of the radiant energy spectrum.

In our copending application for a Radiant Energy Detector and Magnetic Space Filter for Use Therein, Serial No. 664,066, filed June 7, 1957, and assigned to the assignee of the instant invention, there is described a radiant energy detector employing a magnetic space filter, forming apparatus especially suitable for detecting small relatively intense sources of infrared radiation under high background or ambient radiation conditions, such for example as a jet aircraft engine in a relatively bright daylight sky. One of the embodiments shown in the hereinbefore mentioned copending application also provides information about the location of the target source in elevation and azimuth.

The apparatus of the instant invention provides for tracking a relatively small source of relatively intense infrared energy in a background of radiation which need be only of slightly less intensity than the radiation from the source or target to be tracked. There are provided magnetic field producing means, two pairs of radiant energy detector elements, each of which produces a direct current potential when illuminated by radiant energy and which are preferably of the semiconductor type, mounted to be moved together as a multiple cell, the elements of one pair being located above and below the normal center position or tracking axis position of a target, the elements of the other pair being located on each side of the normal center position. The elements of each pair are connected in series in polarity opposition, and thence the pairs are connected to elevation and azimuth signal utilization devices, respectively. At the signal utilization devices, the signals from the detector elements vary in polarity depending upon the sense or direction of the deviation of the target source from its normal center position. Outputs from the signal utilization devices are used to move the multiple cell of detector elements in a manner which tends to restore the target to the center position, thereby tracking the target in a pair of mutually perpendicular planes, for example, in azimuth and elevation.

Accordingly, it is a primary object of the invention to provide new and improved tracking apparatus.

Another object is to provide new and improved apparatus for tracking a source of infrared radiation in a background of high radiation intensity.

Figure 2:
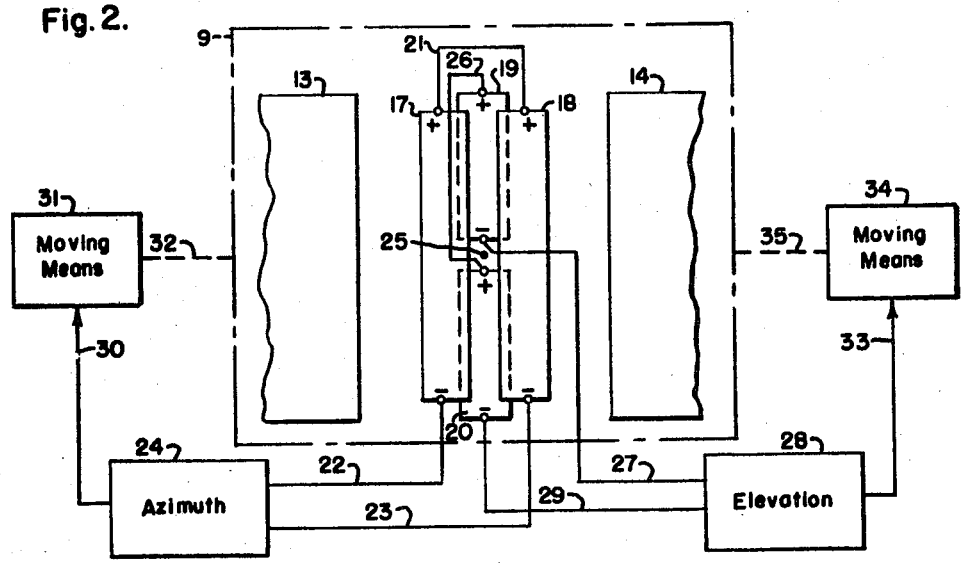

Other objects and advantages will become apparent after a study of the following specification when read in connection with the accompanying drawings, in which like reference numerals are used throughout to designate like parts, and in which:

Figure 1 is a perspective view of a detector element and magnetic field producing means, illustrating the principle of operation of the invention; and Fig. 2 is a view of tracking apparatus according to the preferred embodiment of the invention.

In Fig. 1, to which particular attention is now directed, there is shown at 10 a detector element which is preferably composed of a semiconductor material such, for example, as indium antimonide. The detector element 10 is subjected to a magnetic field 12 provided by suitable field producing means having magnetic pole pieces 13 and 14 disposed in the position shown with respect to the detector element 10. Radiant energy impinges on the detector element 10 from a direction and in the path indicated by the arrows 11. In accordance with the photo-electric-magnetic effect, photons in light energy impinging upon a semiconductor filament impart their energy to valence electrons in the semiconductor causing them to break their valence bonds and thus provide electron-hole pairs of current carriers. The light energy impinging on the detector element 10 in the presence of the magntic field 12 causes the electrons in the element 10 to move in the direction indicated by the arrow 15 while the holes in the semiconductor of the element 10 move in the opposite direction as indicated by the arrow 16. Accordingly, in the presence of a source of light energy, if the detector element 10 has the ends thereof connected in an electrical circuit with suitable indicating apparatus, an electrical signal is provided which varies in amplitude in accordance with variations in the strength of the radiant or light energy impinging on the detector element 10, and the polarity of the electrical signal is as indicated in Fig. 1.

Particular reference is made now to Fig. 2, in which there is shown the preferred embodiment of apparatus for tracking a moving target in two dimensions or planes substantially perpendicular to each other such, for example, in azimuth and elevation. In Fig. 2, the pole pieces 13 and 14 provide a magnetic field in a manner similar to the manner of field production of Fig. 1. Four detector elements 17, 18, 19 and 20 are provided and are disposed in predetermined positions with respect to each other substantially in the manner shown, movable mounting means 9 being provided for moving all of the elements and the magnetic field producing means together, in a manner to be made hereinafter more clearly apparent. The pair of elements 19 and 20 may be behind the pair of elements 17 and 18. In accordance with the direction of the magnetic field between pole pieces 13 and 14, and the direction from which the light energy impinges on detector elements 17, 18, 19 and 20, the upper ends of each of the four elements 17, 18, 19 and 20 will become positive with respect to the lower ends thereof, which, for the purposes of this description, will be referred to as the negative end. The aforementioned elements 17 and 18 have the upper or positive ends thereof connected together by way of conducting means 21, and the lower or negative end of element 17 is connected by lead means 22 to a suitable signal indication or signal utilization device, shown in block form and generally designated 24. In like manner, the lower or negative end of detector element 18 is connected by lead means 23 to the device 24.

Assume, for purposes of explanation, that the four detector elements 17, 18, 19 and 20 are mounted by means 9 with their long axes in vertical positions and that light from a small target source of radiant or light energy is focused by any suitable means, not shown, such, for example, as a lens system, at the small circle 25, with the result that neither of the detector elements 17 or 18 is illuminated by light from the source. Under such a condition, no appreciable signal exists on the lead means 22 and 23. Assume for purposes of description, that there is no substantial background infrared radiation, such a condition being provided for example by a night sky. Further, assume for purposes of description, that the aforementioned target source of radiant energy such, for example, as a source of infrared energy provided by a jet aircraft or jet or rocket propelled missile moves to the left as seen in Fig. 2 and the circle 25 illuminates the detector element 17. While detector element 17 is being illuminated, a potential difference is generated between the upper and lower ends thereof and this potential difference is applied by way of lead means 22, and by way of lead means 21, detector element 18 and lead means 23 to the signal indication or signal utilization means 24. In this case, the lead means 21 and 23 have a positive potential applied thereto, whereas the lead means 22 has a negative potential applied thereto.

Assume for purposes of description, that the small source of radiant or light energy moves to the right as viewed in Fig. 2 with the result that the detector element 18 is illuminated by circle 25 while the detector element 17 is not illuminated by light from the target source of light energy. Under such a condition, a positive potential is applied from the upper terminal of element 18 by way of lead means 21, element 17 and lead means 22 to the indicator or tracking signal generator means 24 while a negative potential is applied from the lower end of element 18 by way of lead means 23 to apparatus 24. Accordingly, the potential difference between lead means 22 and 23 and applied to apparatus or indicator 24 reverses its polarity when the target reverses its sense or direction of movement from the center point 25 in a horizontal plane, and the apparatus or indicator 24 may be suitably calibrated, as will be readily understood by those skilled in the art, to provide an indication of target movement in azimuth, or to provide an amplified signal, or to control an energizing potential which may be applied by means 30 to moving means 31 of conventional design connected to movable support 9 by means 32 for moving the detector elements and the magnetic field producing means together to track the target in azimuth.

The aforementioned pair of detector elements 19 and 20 provide for detection of movements of the target in elevation. The upper terminal of element 20 is connected by lead means 26 to the upper terminal of element 19. The lower or negative terminal of element 19 is connected by lead means 27 to a suitable signal indicating or signal utilization circuit shown in block form and generally designated 28. The lower or negative terminal of element 20 is connected by way of lead means 29 to the apparatus shown in block form at 28. Assume, for purposes of description, that the target energy is focused at the aforementioned circle 25 while the circle is in the position shown in Fig. 2. In this case, neither of the elevation elements 19 and 20 is illuminated by light from the target and no signal is applied by lead means 27 and 29 to the indicator or signal utilization apparatus 28. Assume now, for purposes of description, that the target moves so that element 19 is illuminated by light energy from the target. In this case, a positive potential is applied by way of lead means 26, element 20 and lead means 29 to the apparatus 28 and a negative potential is applied by way of lead means 27 to the apparatus 28. Assume now, for purposes of description, that the target moves in the opposite direction and that the detector element 20 is illuminated while the element 19 is not illuminated by light energy from the target. In this case, a negative potential is applied by way of lead means 29 to apparatus 28 while a positive potential is applied by way of lead means 26, element 19 and lead means 27 to apparatus 28. There is provided then on the lead means 27 and 29 a signal which reverses in polarity in accordance with the sense or direction of movement of the target from a center point within a substantially vertical plane, and the signal at apparatus 28 may be utilized to provide an indication of the movement of the target in elevation, or the signal at 28 may be amplified, or may control an energizing potential, applied by means 33 to moving means 34 connected by means 35 to movable support 9 to track the target in elevation, that is, to move the assembly and the magnetic field producing means in a manner which tends to restore the target to its center position as indicated by the point 25.

One of the hereinbefore stated objects of the invention is to provide apparatus for tracking an infrared target source in a background of high radiation intensity. Assume, for purposes of description, that element 17 is similar to element 18, that element 19 is similar to element 20, and that all four detector elements 17, 18, 19 and 20 are illuminated in substantially equal amounts by light energy from a bright daylight sky. In that event, the potential generated in element 17 by the background radiation is equal and of opposite polarity to the potential generated in element 18, and these background potentials or signals cancel with the result that no background signal is applied on leads 22 and 23 to apparatus 24. In like manner, the potentials generated in elements 19 and 20 as a result of background radiation are equal and of opposite polarity, with the result that no background signal is applied by leads 27 and 29 to elevation apparatus 28.

As previously stated, the amplitude of the potential generated by a detector element varies with variations in the intensity of the light energy impinging thereon, being a direct function thereof. Accordingly, illumination of one of the elements 17, 18, 19 and 20 by the target to be tracked will increase the potential generated thereby, and the potential difference between the target-illuminated element and the co-element illuminated by background radiation only is applied to the signal utilization means connected thereto and used for tracking purposes.

Whereas azimuth signal utilization means 24 and moving means 31 have been separately shown for ease of illustration, it should be understood that these may be one, and the terms "signal uilization means" and "tracking signal obtaining means" as used in the claims appended hereto may include moving means. In like manner, 28 and 34 may be one. One moving means for moving mount 9 in both elevation and azimuth may replace means 31 and 34; elements 24 and 28 may also be combined in one element.

Elements 17, 18, 19 and 20 may have any suitable dimensions. The elements may advantageously have widths comparable to the size of the target image, and the separation between pairs of sensing elements is preferably no larger than the effective image size.

Whereas the invention has been shown and described with reference to a steady magnetic field, it should be understood that an alternating magnetic field, or a pulsed magnetic field, could be used if desired. In the case of an alternating magnetic field, the useful signal output characteristic could be embodied in a phase relationship.

Whereas the invention has been shown and described with reference to the use of semiconductor detector elements, it should be understood that other types of radiant energy sensitive devices could be employed such, for example, as photocells, photovoltaic devices, and so forth.

Whereas the invention has been shown and described with respect to a preferred embodiment thereof which gives satisfactory results, it should be understood that changes may be made and equivalents substituted without departing from the spirit and scope of the invention.

We claim as our invention:

1. In light energy tracking apparatus for use with a small light energy source, in combination, semiconductor means forming a pair of light sensitive elements, magnetic field producing means for applying one and the same magnetic field to both elements of said pair, each of said elements producing an electrical signal of predetermined polarity having an amplitude which varies in accordance with variations in the intensity of the light energy from said source impinging on the element, means movably mounting said pair of light sensitive elements for movement together in a predetermined plane substantially without limiting the light from said source impinging on said pair of sensitive elements, tracking signal obtaining means operatively connected to said movable mounting means, and electrical circuit means connecting said pair of sensitive elements in series in polarity opposition to said tracking signal obtaining means.

2. In apparatus for tracking a small target source of light energy, in combination, signal obtaining means including two pairs of semiconductor detector elements mounted in predetermined positions with rsepect to each other about a preselected point corresponding to the normal target circle center position, the elements of each pair being on opposite sides of said point, the distance between the elements of each pair being substantially equal to the diameter of the circle, said pairs lying in mutually perpendicular planes, magnetic field producing means for applying one and the same magnetic field to all the elements of said two pairs, each of said detector elements while illuminated by light energy from said source producing a signal of predetermined polarity and having an amplitude which varies in accordance with variations in the intensity of the light energy, circuit means connecting the elements of each pair in series in polarity opposition, two signal utilization means, and means connecting one signal utilization means to each of said pairs of detector elements, said pairs of detector elements providing to the respective signal utilization means signals of variable polarity whose instant polarity is in accordance with the direction the target deviates from said center position in one of said planes.

3. In light energy tracking apparatus for use with a small light energy source, in combination, semiconductor means forming a pair of light sensitive elements, magnetic field producing means for applying one and the same magnetic field to both elements of said pair, each of said semiconductor elements utilizing the photoelectric-magnetic effect to produce an electrical signal of predetermined polarity having an amplitude which varies in accordance with variations in the intensity of the light energy from said source impinging on the element, movable means for mounting said pair of elements substantially without limiting the light from said source impinging on said pair of elements, tracking signal obtaining means, electrical circuit means connecting said sensitive elements in series in polarity opposition to said tracking signal obtaining means, and moving means operatively connected to said tracking signal obtaining means to receive a tracking signal therefrom and connected to said movable mounting means to move the mounting means in accordance with variations in the tracking signal, said tracking signal obtaining means being constructed and arranged to provide a variable tracking signal in accordance with variations in the relative intensities of illumination of said pair of light sensitive elements.

4. Light energy tracking apparatus for use with a small light energy source comprising, in combination, a pair of light sensitive elements composed of a semiconductor material, said pair of light sensitive elements being adapted to have light energy impinge thereon, means disposed in predetermined position with respect to said pair of light sensitive elements for applying a magnetic field to said pair of elements, each of said elements being constructed and arranged to provide for a current flow therein in accordance with the strength of the light energy from said source impinging thereon and having a polarity in accordance with the direction of the magnetic field applied thereto, tracking signal obtaining means, and circuit means connecting said pair of elements in series in polarity opposition to said tracking signal obtaining means, said pair of light sensitive elements providing a signal to the tracking signal obtaining means of variable polarity in accordance with which of said elements is illuminated by light energy more strongly than the other element.

5. In light energy tracking apparatus for use with a small light energy source, in combination, a pair of light sensitive elements composed of a semiconductor material, said pair of light sensitive elements being adapted to have light energy from said source impinge thereon, means disposed in predetermined position with respect to said pair of light sensitive elements for applying a magnetic field to said pair of elements, each of said elements providing for a current flow therein in accordance with the strength of the light energy impinging thereon and having a polarity in accordance with the direction of the magnetic field applied thereto, movable means for mounting said pair of light sensitive elements substantially without limiting the light from said source impinging on said pair of elements, tracking signal obtaining means, circuit means connecting said pair of elements in series in polarity opposition to said tracking signal obtaining means, and moving means operatively connected to said tracking signal obtaining means and to said movable mounting means for moving the mounting means in accordance with variations in the tracking signal.

6. In light energy tracking apparatus for use with a small light energy source, in combination, detector means forming two pairs of light sensitive elements and including magnetic field producing means, each of said elements being composed of a semi-conductor material, said detector means being constructed and arranged whereby each of said elements utilizes the photo-electric-magnetic effect to produce an electrical signal of predetermined polarity having an amplitude which varies in accordance with variations in the intensity of the light energy from said source impinging on the element, first and second tracking signal obtaining means, first electrical circuit means connecting one pair of sensitive elements in series in polarity opposition to said first tracking signal obtaining means, and second electrical circuit means connecting the other pair of sensitive elements in series in polarity opposition to said second tracking signal obtaining means.

7. In light energy tracking apparatus for use with a small light energy source, in combination, four light sensitive elements composed of a semiconductor material, means for applying a magnetic field to said light sensitive elements, each of said elements providing for a current flow therein in accordance with the strength of the light energy from said source impinging thereon and having a polarity in accordance with the direction of the magnetic field applied thereto, first and second tracking signal obtaining means, first circuit means connecting two of said elements in series in polarity opposition to said first tracking signal obtaining means, and second circuit means connecting the other two of said light sensitive elements in series in polarity opposition to said second tracking signal obtaining means.

8. Light energy tracking apparatus for use with a small light energy source comprising, in combination, four light sensitive elements composed of a semiconductor material, movable means for mounting said four light sensitive elements substantially without limiting the light from said source impinging on said light sensitive elements, said light sensitive elements having light energy from the small source impinge thereon, means for applying one and the same magnetic field to all said light sensitive elements, each of said elements utilizing the photo-electric magnetic effect to provide for a current flow therein in accordance with the strength of the light energy impinging thereon and having a polarity in accordance with the direction of the magnetic field applied thereto, tracking signal obtaining means, first circuit means connecting one pair of elements in series in polarity opposition to said tracking signal obtaining means, second circuit means connecting the other pair of elements in series in polarity opposition to said tracking signal obtaining means, and moving means operatively connected to said tracking signal obtaining means and to said movable mounting means for moving the mounting means in accordance with variations in at least one tracking signal provided by the tracking signal obtaining means.

9. In light energy tracking apparatus for use with a small light energy source, in combination, a pair of light sensitive elements, means disposed in predetermined position with respect to said pair of sensitive elements for subjecting said pair of elements to one and the same magnetic field, each of said elements being composed of a semiconductor material and generating a signal in accordance with the strength of the light energy from said source impinging thereon and having a polarity in accordance with the direction of said magnetic field, tracking signal obtaining means, and electrical circuit means connecting said pair of sensitive elements in series in polarity opposition to said tracking signal obtaining means.

10. In light energy tracking apparatus for use with a small light energy source, in combination, four light sensitive elements composed of a semiconductor material, means disposed in predetermined position with respect to said four light sensitive elements for subjecting said four elements to one and the same magnetic field, each of said elements generating a signal in accordance with the strength of the light from said source impinging thereon and having a polarity in accordance with the direction of said magnetic field, first and second tracking signal obtaining means, first electrical circuit means connecting two of said sensitive elements in series in polarity opposition to said first tracking signal obtaining means, and second electrical circuit means connecting the other two of said sensitive elements in series in polarity opposition to said second tracking signal obtaining means.

11. Light energy tracking apparatus for use with a small light energy source comprising, in combination, a pair of light sensitive elements composed of a semiconductor material, movable means for mounting said pair of elements substantially without limiting the light from said source impinging on said sensitive elements, means disposed in predetermined position with respect to said pair of elements for subjecting said pair of elements to a magnetic field, each of said elements generating a signal in accordance with the strength of the light energy from said source impinging thereon and having a polarity in accordance with the direction of said magnetic field, tracking signal obtaining means, electrical circuit means connecting said pair of elements in series in polarity opposition to said tracking signal obtaining means, and moving means operatively connected to said tracking signal obtaining means and to said movable mounting means for moving the mounting means in accordance with variations in the signals from said pair of elements.

12. Light energy tracking apparatus for use with a small light energy source comprising, in combination, four light sensitive elements composed of a semiconductor material, movable means for mounting said elements substantially without limiting the light from said source impinging on said sensitive elements, means disposed in predetermined position with respect to said four elements for subjecting all said elements to a magnetic field, each of said elements generating a signal in accordance with the strength of the light energy from said source impinging thereon and having a polarity in accordance with the direction of said magnetic field, moving means, and electrical circuit means connecting all of said elements to said moving means, said moving means being connected to said movable mounting means for moving the same in accordance with variations in the signals from said sensitive elements.

13. Magnetic tracking detector apparatus for use with a small light energy source comprising, in combination, four light energy sensitive detector elements each composed of a semiconductor material, magnetic field producing means disposed in predetermined position with respect to all of said detector elements for subjecting each of the detector elements to one and the same substantially constant magnetic field having a preselected polarity, each of said light sensitive elements utilizing the photo-electric-magnetic effect to produce an electrical signal which varies in amplitude in accordance with variations in the light energy from said source impinging on the element, movable means for mounting all said detector elements and said magnetic field producing means for movement together substantially without limiting the light from said source impinging on said light sensitive elements, said movable mounting means being adapted for movement in a pair of substantially mutually perpendicular planes, said detector elements being disposed in pairs in two mutually perpendicular planes about a normal target circle center position with the elements of each pair on opposite sides of the center position, the distance between the elements of each pair being substantially equal to the diameter of the circle, light energy from the target source while the target is in the center position substantially illuminating none of said detector elements, circuit means connecting the positive terminals of a first pair of said elements together, other circuit means connecting the positive terminals of the second pair of detector elements together, means connected to said first pair of detector elements and responsive to a change in polarity of the signal applied thereto from the first pair of detector elements for obtaining an azimuth tracking signal, moving means having said azimuth tracking signal applied thereto and operatively connected to the movable mounting means, elevation tracking signal obtaining means electrically connected to the second pair of detector elements, said elevation tracking signal obtaining means providing a tracking signal and being responsive to changes in the polarity of the signal applied thereto, and other moving means having the elevation tracking signal applied thereto and operatively connected to said movable mounting means, variation of the target to be tracked from the center position in a first plane providing for illumination of one of said first pair of detector elements and the generation of an azimuth tracking signal which moves the movable mounting means in a manner which tends to center the target in azimuth, and movement of the target from the center position in a second plane providing for the generation of an elevation tracking signal which moves the movable mounting means in a manner which tends to restore the target to its center position in elevation.

References Cited in the file of this patent

UNITED STATES PATENTS

| | | |
|---|---|---|
| 2,155,402 | Clark | Apr. 25, 1939 |
| 2,262,942 | Jones | Nov. 18, 1941 |
| 2,431,625 | Tolson | Nov. 25, 1947 |
| 2,678,401 | Jaeger | May 11, 1954 |
| 2,726,312 | Dunlap | Dec. 6, 1955 |
| 2,788,452 | Sternglass | Apr. 9, 1957 |

OTHER REFERENCES

Kurnick et al.; Journal of Applied Physics; vol. 27; No. 3; March 1956; pp. 278–285.